Patented June 4, 1946

2,401,666

UNITED STATES PATENT OFFICE 2,401,666

PAINT COMPOSITIONS FROM AQUEOUS AND NONAQUEOUS VEHICLE

Marvin T. Schmidt, Chicago, Ill., assignor to United States Gypsum Company, Chicago, Ill., a corporation of Illinois No Drawing. Application September 27, 1943, Serial No. 504,059

9 Claims. (Cl. 106—253)

This invention relates to an improved paint composition particularly one which can be thinned with either an aqueous or non-aqueous vehicle.

Many attempts have been made in the past to produce a paint composition which can be thinned with either an organic solvent or with water. None of these paints have met with appreciable success as shown by the fact that no such material has reached commercial prominence.

All emulsion paints in the trade have been limited primarily to those which are thinnable with water only. While these paints have already achieved outstanding commercial importance, they can be improved still further in several respects.

For instance, when the regular emulsion paint is subjected to freezing temperature the water is isolated thereby destroying the stability of the emulsion and this inherent instability of the emulsion causes it to slowly coalesce with age. Also, these paints are limited in scope to application to walls. While they can be applied to wood or paper surfaces they cause unsatisfactory fiber raising due to the presence of the moisture, thus giving an undesirable roughened or irregular surface.

A decided advancement in the art of paint manufacture would be achieved if a universal paint was obtained which could not only be thinned with water but also with drying oil or other oleaginous materials and their solvents. This paint when thinned with water could be used over walls in the manner now common in the art, and also, could be thinned with oil, varnishes, paint solvents, etc., and be used as a flat or semi-gloss paint over woodwork, paper, etc., without the difficulty of fiber raising. It also will be rendered much more water resistant and thereby be more suitable for washing to remove dirt. It can be used upon interior and exterior surfaces in the same manner and for the same purpose as oil paints.

This paint when thinned in this manner can be applied in below freezing weather without danger of freezing.

Therefore, it is the purpose of this invention to disclose a paint which not only meets the requirements of universal thinnability, as mentioned above, but also had other novel embodiments hitherto not obtained in any emulsion paint.

The above improved paint is obtained by a novel use of emulsifying agents and solvents in the preparation of the paint. It has been discovered that a certain combination of emulsifying agents and solvents gives a paint having unexpected improved properties.

This improvement in the art of manufacturing an emulsion paint is obtained by the use of an emulsifying agent which will be diffusible in an organic solvent and yet at the same time effect quick emulsification of the drying oil with water when the paint is stirred therein. In addition it is important that the proper type of solvent be used to form a paste with the paint solids.

It has been discovered that emulsifying agents made from a drying oil type fatty acids are very effective in accomplishing the above purpose. The soap is best prepared in situ by incorporating the fatty acids and an alkali in the formula during the preparation of the paint; though the soap may be prepared first and then introduced into the paint. In order to obtain the full benefits of this invention it is preferred to use an unstable soap of a drying oil fatty acid such as that formed with ammonia. In such case, when the paint has been applied in a thin film and dried, the ammonia evaporates, thus destroying the emulsifying properties of the soap. When this film is subsequently washed there will be no re-emulsification of the paint as the emulsifying agent has been destroyed.

A number of drying oil and semi-drying oil fatty acids can be used to make the emulsifying agents, such, for example, as those made from natural oils as linseed oil, soya bean oil, tung oil, sunflower seed oils, etc., or from an artificial drying oil, such as dehydrated castor oils, or the "Neofats," a highly unsaturated fatty acid of a marine oil. Any of the unsaturated fatty acids can be used for the purpose, but those aliphatic acids of 12 to 24 carbon atoms per molecule are preferred either in the saturated or unsaturated states. Also, those formed from rosin or rosin acids can be used.

While the ammonia soap or salt of the fatty acid appears to have the desired property of loss of emulsifying power when applied to the wall and dried, due to decomposition and loss of the ammonia by volatilization, other similar acting materials may be used; and any alkali having this property whether organic or inorganic is an equivalent material and within the scope of this invention. Morpholine is an example of such a material, as well as the volatile saturated cyclic amines, or low boiling alkyl or alkylol substituted amines. These can be used interchangeably with ammonia. While volatile soaps are preferred, other alkaline soaps may be used with consequent decrease in washability.

Besides the use of the proper type of emulsifying agents, another important ingredient of this composition is a water resistant vehicle of some type of film forming substances. This material preferably should be composed of a drying type of oil material, such as, linseed oil, soya oil, sunflower seed oil, dehydrated castor oils, triglycerides of a fatty acid obtained from marine oils, known as "Neofats T. G.," tung oil or varnishes made from such types of oils with various natural and artificial gums or resins, such as ester gum, copal, alkyd resin, phenol formaldehyde resin, etc. Though, of course, any film forming material regardless of its drying properties, which can be used in the ordinary conventional oil paint, will be sufficient for the purpose. This may include tall oil, esters of abietic acid, polymerized diolefines, etc.

A paint composition made from a drying oil type of material or a varnish made from such a material along with the emulsifier composed of a fatty acid soap, such as that referred to above, and the necessary pigments would be too thick for ready dispersion with water to form an emulsion; hence, a solvent must be used to thin the mixture to a paste which will permit ready dispersion.

Not every type of solvent can be used for the purpose. It has been discovered that the only satisfactory types of solvent are those derived from coal tar such as benzol, toluol, xylol, naphtha, etc. Very satisfactory results have been obtained with a coal tar naphtha sold under the trade name 2-50-W Hi Flash Naphtha, which has a boiling range of 298-369° F. Because of the superior results obtained with this material it is recommended for use in all of the forthcoming examples. It is not intended thereby to limit the scope of this invention to this particular naphtha for other coal tar solvents can be used. The exact reason for the outstanding success obtained with coal tar solvents, particularly that disclosed above, is not entirely clear. It may be due to an improved emulsifying or solvent characteristic of this material.

Examples of preferred embodiments of this invention will be subsequently set forth. It is not the intention to limit this invention thereto, but only thereby to illustrate means by which this invention may be carried out; for other formulations will readily occur to those skilled in the art in which this invention is a part and still not depart from the scope of this invention.

*Formula I*

Vehicle: Parts by weight
    Boiled linseed oil _____ 1000
    Linseed fatty acids _____ 200
    Coal tar naphtha _____ 250
    Morpholine _____ 77

Pigment: Parts
    Chromium oxide _____ 3000
    Clay _____ 1040
    Fibrous talc _____ 285
    Powdered methyl cellulose _____ 15

The vehicle and pigments are first premixed and then mixed with each other.

In order to prevent the formation of lumps of the methyl cellulose which is very fibrous, this material may be dry ground with the remaining pigments.

*Formula II*

Vehicle: Parts
    35 gallon length bodied linseed oil-ester
        gum varnish _____ 1000
    Soya bean oil fatty acids _____ 200
    Coal tar naphtha _____ 250
    Anhydrous ammonia _____ 15

Pigments: Parts
    Chromium oxide _____ 3000
    Clay _____ 1040
    Fibrous talc _____ 284

The vehicle and pigments are first premixed and then mixed with each other. The ammonia is mixed with a premixture of the remaining vehicle.

*Formula III*

Vehicle: Parts
    Dehydrated castor oil _____ 1000
    Dehydrated castor oil fatty acids _____ 200
    Coal tar naphtha _____ 250
    Conc. aqueous ammonia _____ 42

Pigments: Parts
    Chromium oxide _____ 3000
    Clay _____ 1040
    Fibrous talc _____ 285
    Powdered gum tragacanth _____ 15

Vehicle and pigments are premixed and then mixed with each other; the small amount of water remaining with the ammonia is readily emulsified with the oil.

*Formula IV*

Vehicle: Parts
    Glyceride of a highly unsaturated fatty
        acid of a marine oil (Neofat 19
        T. G.) _____ 1000
    A highly unsaturated fatty acid of a
        marine oil (Neofat 19) _____ 200
    Coal tar naphtha _____ 250
    Morpholine _____ 77

Pigments: Parts
    Chromium oxide _____ 3000
    Clay _____ 1040
    Fibrous talc _____ 285
    Dispersed methyl cellulose _____ 45

The vehicle and the pigments are first premixed and then mixed with each other.

*Formula V*

Vehicle: Grams
    Boiled linseed oil _____ 500
    Tung oil _____ 250
    Coal tar naphtha _____ 250
    Sunflower seed oil _____ 250
    The ammonium soap or salt of fatty
        acids from linseed oil _____ 265

Pigments: Parts
    Chromium oxide _____ 3000
    Clay _____ 1040
    Fibrous talc _____ 285
    Soya flour _____ 30

The vehicle and pigment are first premixed and then mixed with each other.

Formula VI

Vehicle: | Parts
---|---
Pentalyn "G" or Pentaerythritol ester | 133
Refined tall oil | 66.5
Coal tar naphtha | 400
Methylamine | 27.5
Pigments: |
Lithopone | 850
Fine mica | 14
China clay | 510
Powdered Irish Moss | 25

The vehicle and pigments are first premixed and then mixed with each other.

Formula VII

Vehicle: | Parts
---|---
Velsicol HE 9, or polymerized diolefines | 200
Coal tar naphtha | 400
Animal fatty acids | 40
Ethanolamine | 54
Pigments: |
Lithopone | 850
Fine mica | 14
China clay | 510
Casein | 20

The vehicle and pigments are first premixed and then mixed with each other.

In the above formulas it may be found desirable to vary the amount of coal tar naphtha, as well as other materials used, in order to obtain the desired paste consistency. A minimum of no less than substantially about 4.0% based upon the weight of the paste, such as in Example IV, should be used. The maximum amount is determined by the desired consistency of the paste. This change is well within the skill of anyone familiar with this art and needs no further explanation. The above are merely exemplary formulas to illustrate preferred means of carrying out this invention and are not intended to limit the scope thereof for other equivalent materials and combinations can be used and still not depart from the ambit of this invention.

It is not the intention to limit the application to the pigments disclosed for obviously other pigments, fillers and powdered inert materials may be used to vary the color and properties of the paint so formed. Thickening agents other than those disclosed may be used and those given in one formula may be substituted into others and may be left out altogether though they are preferred in order to decrease settling of the pigments when emulsions are thinned with water to application consistency.

In cases where it is more expedient to handle the ammonia as a soap the reaction between the ammonia and the fatty acid may take place elsewhere than within the formulation itself. Where facilities will permit, it is preferred to add the ammonia in liquid form in order to decrease the amount of water left in the paint after preparation.

The paint formed in accordance with the above examples will be found to have high washability and high stability during aging. It will not be adversely affected by freezing and will not come off readily when washed with water due to a re-emulsification of the film. This paint while in thick paste form can be readily thinned with twice its volume of water. The paste paint commonly sold can only be thinned with approximately 50% of its volume of water. This high ratio of finished paint to paste is a decided advantage of this type of material for a substantial saving in cost and added convenience is obtained in the commercial distribution of this product. Less volume and weight of material are needed and shipped. No other water dispersible paste paint has this outstanding property of high dilution ratio. The emulsion quickly takes place during stirring and very little difficulty will be experienced in forming it.

In addition this paint besides being thinned with water, has the remarkable property of being thinnable with the ordinary commercial type of organic solvents, such as paint and varnish naphtha, benzene, alcohol, butyl alcohol, acetone, etc., thus permitting use in cold weather and in places where the use of water is undesirable, such as, for example, over wood, paper, etc., where fiber raising would take place. In other words, the material which is the subject of this invention is a "universally dispersible" material. By "universally dispersible" is meant a paint which can be readily thinned with water by forming an emulsion therewith and with ordinary paint thinners, such as those referred to above.

Any type of pigments or fillers, or none at all, can be used with this paint, depending upon the purpose to which this material is to be applied. Since this type of paint or binder can be thinned with either an aqueous or non-aqueous vehicle, the index of refraction is not as important as if only a non-aqueous vehicle were used. Thus it is possible to employ a large quantity of the low index of refraction materials, such as clay, mica, etc., which are known to the trade as fillers or extenders, replacing a certain amount of the more expensive higher index of refraction materials, such as, lithopone, titanium dioxide and other pigments. In order to define these two types of material generically the words "pigment-fillers" are used throughout the forthcoming claims.

A paste of this type is very well suited in dispensing colors for mixing with paints as it can be used with either an oil or aqueous type of paint.

By way of summary, this invention comprises a paint composition readily thinnable with either water or an organic solvent and which will not deteriorate with age due to freezing, by comingling a film forming material with an alkali, preferably a volatile alkali which forms unstable fatty acid soaps, such as, ammonia, with a drying or semi-drying fatty acid and suitable pigments with or without a thickening agent, such as methyl cellulose, the composition so formed possessing a high ratio of volume of paint as application consistency to volume of paste used, this ratio being near the order of 2 to 1, and also being substantially non-re-emulsifiable after applied in film form after a short length of time.

Having disclosed a practical embodiment of my invention and specific examples, theories and uses which are given to insure a clear understanding of the essence of this invention, it is the intention not to be limited thereby for obviously many variations may be made by those skilled in the art and still be within the scope of this invention which is only limited in extent by the forthcoming claims.

It is claimed:

1. A paint product in paste form consisting substantially of an oleaginous film forming material of the drying type, the reaction product of an aliphatic fatty acid of from 12 to 24 inclusive carbon atoms and a volatile alkaline reacting material, not less than substantially about 4.0% by weight of the paste as a coal tar solvent, and pigment-fillers, said paste paint being dispersible in either water or common commercial organic paint solvents.

2. The product claimed in claim 1 in which said coal tar solvent is a coal tar naphtha.

3. A paint product in paste form consisting substantially of an oleaginous film forming substance of the drying type, the reaction product of an aliphatic fatty acid of from 12 to 24 inclusive carbon atoms and a volatile alkaline reacting material, not less than substantially about 4% by weight of the paste as a coal tar solvent, a thickening agent, and pigment-filler, said composition being dispersible in either water or common commercial organic paint solvents as vehicle.

4. The product claimed in claim 3 in which said coal tar solvent is a coal tar naphtha.

5. A paint product in paste form consisting substantially of 1000 parts by weight of an oleaginous film forming substance of the drying type, 50 to 400 parts by weight of a soap of an aliphatic fatty acid of from 12 to 24 inclusive carbon atoms and a volatile alkaline reacting substance, 1000 to 3500 parts by weight of pigment-fillers and not less than substantially about 4.0% by weight of the paste as a coal tar naphtha to render the composition in paste form for ease in dispersion in water or common commercial organic solvents as vehicle.

6. A stable universally dispersible paint in paste form of high washability when formed into a dry film, consisting substantially of an oleaginous film forming substance of the drying type, an emulsifying agent comprising the soap formed by the reaction of a volatile amino compound with an aliphatic fatty acid of from 12 to 24 inclusive carbon atoms, said soap characterized by being ineffective as an emulsifying agent when dried, pigment-fillers, and not less than substantially about 4.0% by weight of the paste as a coal tar solvent to render the composition in paste form for ease in dispersion in water or common commercial organic paint solvents as vehicles.

7. The product claimed in claim 6 in which said coal tar solvent is a coal tar naphtha.

8. A universally dispersible paint composition in paste form dispersible in either water or common commercial organic paint solvents as vehicle, consisting substantially of an oleaginous film forming substance of the drying type, an emulsifying agent characterized by being irreversible when dried comprising a soap formed by the reaction of a volatile alkaline reacting substance and an acid selected from the group consisting of aliphatic fatty acids of 12 to 24 inclusive carbon atoms per molecule and rosin acids; not less than substantially about 4.0% by weight of the paste as coal tar solvent, and pigment-filler.

9. The product of claim 8 in which said coal tar solvent is a coal tar naphtha.

MARVIN T. SCHMIDT.